(12) United States Patent
Wang et al.

(10) Patent No.: US 10,424,072 B2
(45) Date of Patent: Sep. 24, 2019

(54) LEVERAGING MULTI CUES FOR FINE-GRAINED OBJECT CLASSIFICATION

(71) Applicant: Samsung Electronics Co., Ltd., Suwon-si, Gyeonggi-do (KR)

(72) Inventors: Xiaolong Wang, Sunnyvale, CA (US); Robert Li, San Jose, CA (US); Jon Currey, Belmont, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/418,614

(22) Filed: Jan. 27, 2017

(65) Prior Publication Data

US 2017/0256068 A1    Sep. 7, 2017

Related U.S. Application Data

(60) Provisional application No. 62/302,048, filed on Mar. 1, 2016.

(51) Int. Cl.

| | | |
|---|---|---|
| *G06T 7/33* | (2017.01) | |
| *G06T 7/80* | (2017.01) | |
| *G06K 9/46* | (2006.01) | |
| *G06K 9/62* | (2006.01) | |
| *G06K 9/00* | (2006.01) | |
| *G06T 7/73* | (2017.01) | |

(52) U.S. Cl.
CPC .......... *G06T 7/337* (2017.01); *G06K 9/00208* (2013.01); *G06K 9/4604* (2013.01); *G06K 9/6211* (2013.01); *G06K 9/6244* (2013.01); *G06T 7/74* (2017.01); *G06T 7/80* (2017.01); *G06K 9/4671* (2013.01); *G06T 2207/30244* (2013.01)

(58) Field of Classification Search
CPC .... G06K 9/4604; G06K 9/6211; G06T 7/337; G06T 7/74; G06T 7/80; G06T 2207/30244

See application file for complete search history.

(56) References Cited

U.S. PATENT DOCUMENTS

| | | |
|---|---|---|
| 6,301,370 B1 | 10/2001 | Steffens et al. |
| 7,043,056 B2 | 5/2006 | Edwards et al. |
| 7,505,621 B1 | 3/2009 | Agrawal et al. |
| 7,657,083 B2 | 2/2010 | Parr et al. |

(Continued)

FOREIGN PATENT DOCUMENTS

| | | |
|---|---|---|
| WO | 2011061709 A1 | 5/2011 |
| WO | 2012146253 A1 | 11/2012 |
| WO | 2015154206 A1 | 10/2015 |

OTHER PUBLICATIONS

Zeng, J. et al., "Analysis of Facial Images across Age Progression by Humans", International Scholarly Research Network, 2012, pp. 1-8, vol. 2012, United States.

(Continued)

*Primary Examiner* — Edward Park
(74) *Attorney, Agent, or Firm* — Sherman IP LLP; Kenneth L. Sherman; Hemavathy Perumal

(57) ABSTRACT

One embodiment provides a method comprising estimating a camera pose of an input image and aligning the input image to a desired camera pose based on a feature database. The input image comprises an image of a fine-grained object. The method further comprises classifying the object based on the alignment.

20 Claims, 9 Drawing Sheets

(56) References Cited

U.S. PATENT DOCUMENTS

| | | | |
|---|---|---|---|
| 8,111,904 | B2 | 2/2012 | Wallack et al. |
| 8,116,538 | B2 | 2/2012 | Kim et al. |
| 8,351,662 | B2 | 1/2013 | Wang |
| 8,532,344 | B2 | 9/2013 | Connell et al. |
| 8,582,807 | B2 | 11/2013 | Yang et al. |
| 8,837,779 | B2 | 9/2014 | Meier et al. |
| 9,058,513 | B2 | 6/2015 | Irie |
| 9,081,947 | B2 | 7/2015 | Dewan et al. |
| 9,152,850 | B2 | 10/2015 | Mogi |
| 9,208,337 | B2 | 12/2015 | Tayloe |
| 9,325,707 | B2 | 4/2016 | Ketchantang |
| 9,329,771 | B2 | 5/2016 | Fadell et al. |
| 9,330,426 | B2 | 5/2016 | Davis |
| 9,330,511 | B2 | 5/2016 | Webber et al. |
| 2008/0082426 | A1* | 4/2008 | Gokturk ............ G06F 17/30256 705/26.62 |
| 2008/0260212 | A1 | 10/2008 | Moskal et al. |
| 2008/0260230 | A1* | 10/2008 | Gotardo ............... G06K 9/6207 382/131 |
| 2010/0027895 | A1 | 2/2010 | Noguchi et al. |
| 2011/0243451 | A1* | 10/2011 | Oyaizu ..................... G06T 5/50 382/190 |
| 2011/0286628 | A1 | 11/2011 | Goncalves et al. |
| 2011/0317982 | A1* | 12/2011 | Xu .................... G06F 17/30843 386/241 |
| 2012/0195471 | A1* | 8/2012 | Newcombe ............. G06T 7/194 382/106 |
| 2013/0100119 | A1 | 4/2013 | Evertt et al. |
| 2013/0342702 | A1 | 12/2013 | Zhang et al. |
| 2014/0072185 | A1 | 3/2014 | Dunlap et al. |
| 2014/0079314 | A1* | 3/2014 | Yakubovich ......... G06K 9/6254 382/159 |
| 2014/0098242 | A1 | 4/2014 | Sharma et al. |
| 2014/0254893 | A1 | 9/2014 | Phillips et al. |
| 2014/0304122 | A1 | 10/2014 | Rhoads et al. |
| 2014/0376775 | A1* | 12/2014 | Datta ................... H04N 13/264 382/103 |
| 2014/0378810 | A1 | 12/2014 | Davis et al. |
| 2015/0110381 | A1* | 4/2015 | Parvin ................. G06K 9/6249 382/133 |
| 2015/0138310 | A1* | 5/2015 | Fan .................... G06K 9/00201 348/36 |
| 2015/0178554 | A1 | 6/2015 | Kanaujia et al. |
| 2015/0324655 | A1 | 11/2015 | Chalasani et al. |
| 2016/0070986 | A1* | 3/2016 | Chidlovskii ....... G06K 9/00785 382/104 |
| 2016/0171346 | A1* | 6/2016 | Han ........................ G06K 9/66 382/103 |
| 2016/0232678 | A1* | 8/2016 | Kurz ................. G06F 17/30247 |
| 2016/0358043 | A1 | 12/2016 | Mu et al. |
| 2017/0019653 | A1* | 1/2017 | Chen ......................... G06T 7/00 |
| 2017/0076474 | A1 | 3/2017 | Fu et al. |
| 2017/0154209 | A1 | 6/2017 | Nakano et al. |
| 2017/0256068 | A1* | 9/2017 | Wang ......................... G06T 7/80 |
| 2017/0304732 | A1* | 10/2017 | Velic ..................... A63B 13/65 |
| 2017/0351905 | A1 | 12/2017 | Wang et al. |
| 2017/0351909 | A1 | 12/2017 | Kaehler et al. |

OTHER PUBLICATIONS

Ramanathan, N. et al., "Face Verification across Age Progression", Journal of Visual Language and Computing, 2009, 1-8.

Singh, R. et al., "Age Transformation for Improving Face Recognition Performance", In Pattern Recognition and Machines Intelligence (PReMI 2007), 2007, pp. 576-583, Spinger, Berlin, Heidelberg.

Ling, H. et al., "Face Verification across Age Progression using Discriminative Methods", Proceedings of the IEEE Transactions on Information Forensics and Security, 2010, pp. 1-9, IEEE, United States.

Mahalingam, G. et al., "Age Invariant Face Recognition Using Graph Matching", Proceedings of the 2010 Fourth IEEE International Conference on Biometrics: Theory Applications arid Systems (BTAS), Sep. 27-29, 2010, pp. 1-7, IEEE,United States.

Ling, H. et al., "A Study of Face Recognition as People Age", Proceedings of the IEEE 11th International Conference on Computer Vision (ICCV 2007), Oct. 14-21, 2007, pp. 1-8, IEEE, United States.

Ramanathan, N. et al., "Computational methods for modeling facial aging: A survey", Journal of Visual Languages and Computing, Jun. 2009, pp. 131-144, vol. 20, Issue 3.

Chen, B-C. et al., "Cross-Age Reference Coding for Age-Invariant Face Recognition and Retrieval", ECCV 2014, 2014, pp. 1-16, United States.

Bianco, S. "Large age-gap face verification by feature injection in deep networks", Feb. 19, 2016, pp. 1-7, Cornell University Library, United States.

Du, L. et al., "Cross-Age Face Verification by Coordinating with Cross-Face Age Verification", Proceedings of 2015 IEEE Conference on Computer Vision and Pattern Recognition (CVPR), Jun. 7-12, 2015, pp. 2329-2338, IEEE, United States.

International Search Report and Written Opinion dated Jun. 1, 2017 for International Application PCT/KR2017/002177 from Korean Intellectual Property Office, pp. 1-12, Republic of Korea.

Anonymous, "iPhone 7 may feature Facial Recognition instead of Touch-ID" Blog, Iphone 7 Buzz, Mar. 22, 2015, pp. 1-4, United States [downloaded from http://www.iphone7buzz.com/iphone-7-may-feature-facial-recognition-instead-of-touch-id/ on Jun. 12, 2017].

U.S. Non-Final Office Action for U.S. Appl. No. 15/449,266 dated Oct. 9, 2018.

U.S. Advisory Action for U.S. Appl. No. 15/449,266 dated Apr. 5, 2019.

U.S. Final Office Action for U.S. Appl. No. 15/449,266 dated Feb. 8, 2019.

Extended European Search Report dated Feb. 20, 2019 for European Application No. 17760282.8 from European Patent Office, pp. 1-6, Munich, Germany.

US Notice of Allowance for U.S. Appl. No. 15/449,266 dated May 21, 2019 by Examiner Li Liu.

* cited by examiner

LEVERAGING MULTI CUES FOR FINE-GRAINED OBJECT CLASSIFICATION

CROSS REFERENCE TO RELATED APPLICATIONS

This application claims priority from U.S. Provisional Patent Application Ser. No. 62/302,048, filed on Mar. 1, 2016, incorporated herein by reference.

TECHNICAL FIELD

One or more embodiments relate generally to object classification, and in particular, a system and a method for leveraging multiple cues for fine-grained object classification.

BACKGROUND

Over the years, software application designers employ fine-grained object classification more frequently than generic object classification during software application development. Fine-grained object classification involves at least the following steps: (1) labeling/localizing discriminative parts, and (2) learning appearance descriptors. Conventionally, labeling/localizing discriminative parts is performed using either manual parts annotation or image segmentation, and learning appearance descriptors is performed using a multi-layer deep neural network. As objects classed in a fine-grained object category (i.e., class) share a high degree of shape similarity, performing the steps of labeling/localizing discriminative parts and learning appearance descriptors may be challenging.

SUMMARY

One embodiment provides a method comprising estimating a camera pose of an input image and aligning the input image to a desired camera pose based on a feature database. The input image comprises an image of a fine-grained object. The method further comprises classifying the object based on the alignment.

These and other features, aspects and advantages of the one or more embodiments will become understood with reference to the following description, appended claims and accompanying figures.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

For expository purposes, the term "fine-grained object classification" as used herein generally refers to a type of object classification that involves at least the following steps: (1) labeling/localizing discriminative parts, and (2) learning appearance descriptors.

The terms "object recognition" and "object classification" may be used interchangeably in this specification.

One or more embodiments relate generally to object classification, and in particular, a system and a method for leveraging multiple cues for fine-grained object classification. One embodiment provides a method comprising estimating a camera pose of an input image and aligning the input image to a desired camera pose based on a feature database. The input image comprises an image of a fine-grained object. The method further comprises classifying the object based on the alignment.

One embodiment provides a fine-grained object classification framework that utilizes three-dimensional (3D) camera pose estimation to align images and label/localize discriminative parts. The framework further utilizes a classification scheme including unsupervised feature extraction and classification. Unsupervised feature extraction may be performed utilizing different methods. Unsupervised feature extraction is a lightweight feature extraction scheme that facilitates learning appearance descriptors based on one or more constraints (e.g., constraints of a mobile device, such as small training data size, memory/computational costs, etc.). In one embodiment, unsupervised feature extraction is performed utilizing Convolutional Sparse Coding (CSC) and manifold learning. Similar to using a deep neural network, unsupervised feature extraction produces highly diverse feature filters, allowing capture of both low and high level features. Further, unlike a complex learning framework that utilizes a deep neural network, unsupervised feature extraction significantly reduces model complexity and preserve hierarchical level features. Also, unsupervised feature extraction may utilize a single-layer feature extraction scheme instead of a multi-layer deep neural network to reduce computation time.

Figure 1:
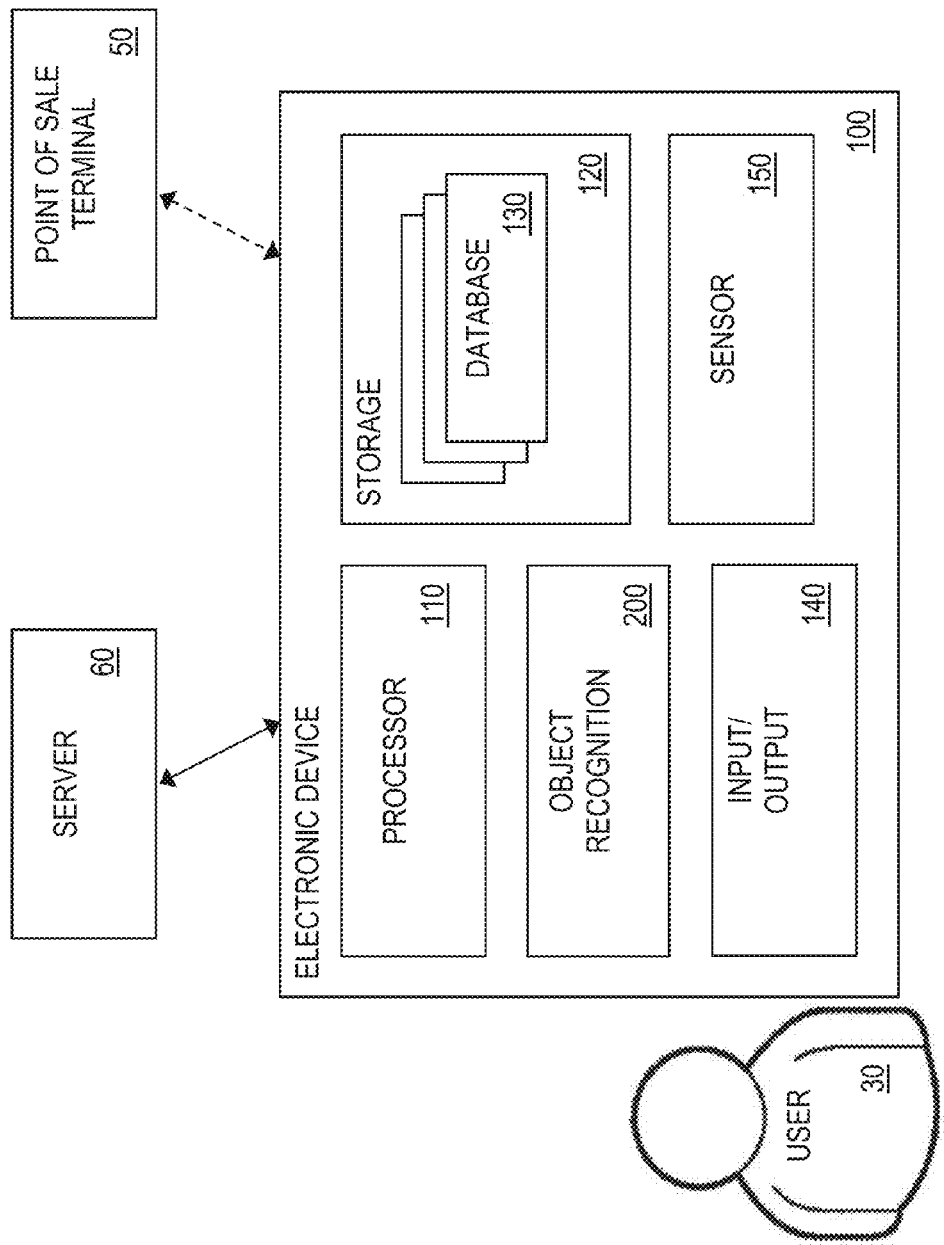
FIG. 1 illustrates an example electronic device including a fine-grained object classification framework, in one or more embodiments.

FIG. 1 illustrates an example electronic device 100 including a fine-grained object classification framework, in one or more embodiments. The device 100 comprises one or more processor units 110 and one or more storage units 120. The one or more storage units 120 may maintain one or more databases 130. One or more applications may execute/operate on the processor units 110. In one embodiment, the applications include an object recognition system 200 for fine-grained object classification. As described in detail later herein, the object recognition system 200 utilizes one or more learned models for fine-grained object classification.

A user 30 may carry on his/her person the device 100. Examples of the device 100 include, but are not limited to, one of the following mobile devices: a tablet, a smart phone, a laptop, a wearable device, etc.

In one embodiment, the user 30 may utilize the device 100 to assist him/her in fine-grained object classification. For example, during a mobile transaction, the user 30 may utilize the device 30 for point of sale (POS) terminal classification (i.e., determine a model of a POS terminal used for the mobile transaction). In one embodiment, the device 100 is configured to exchange data with an object, such as a POS terminal 50, over a connection (e.g., a WiFi connection or a cellular data connection).

In one embodiment, the device 100 is configured to exchange data with one or more remote servers 60 over a connection (e.g., a wireless connection such as a WiFi connection or a cellular data connection, a wired connection, or a combination of the two).

The device 100 further comprises one or more other input/output (I/O) modules 140, such as a keyboard, a keypad, a touch interface, a display screen, etc. The device 100 further comprises at least one sensor module 150 (e.g., a camera, a microphone, etc.) for capturing contextual and/or environmental data. For example, for POS terminal classification, a camera of the device 100 may be used to capture a photo of a POS terminal used during a mobile transaction.

In one embodiment, one or more learned models utilized by the object recognition system 200 for fine-grained object classification are trained offline (i.e., not on the device 100). For example, the learned models may be trained on a remote server 210 utilizing computation resources of the server 210 (e.g., one or more processors 601 and/or one or more storage devices 604). After training, the learned models may be loaded onto/downloaded to the device 100 as a portion of the object recognition system 200. In another embodiment, the learned models are trained on the device 100 itself.

Figure 2:
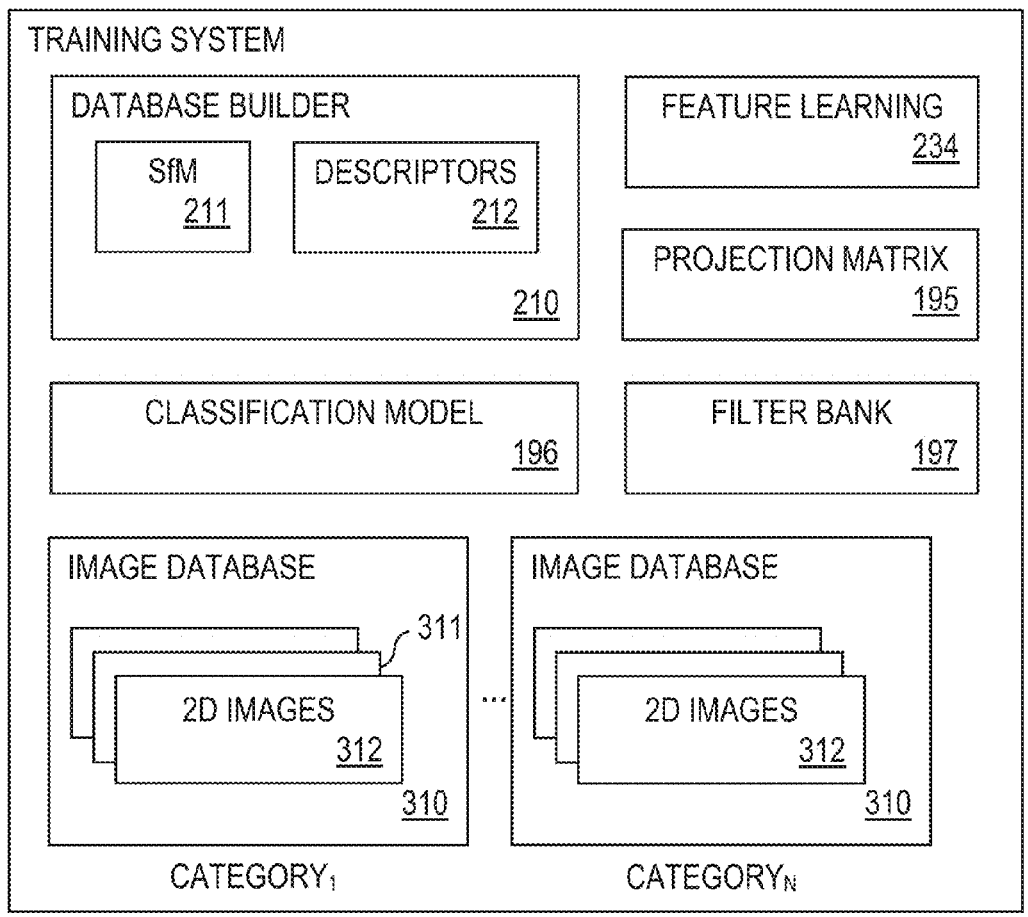
FIG. 2 illustrates an example training system, in one or more embodiments.

FIG. 2 illustrates an example training system 190, in one or more embodiments. In one embodiment, in a training phase, the training system 190 trains one or more learned models utilized by the objection recognition system 200 for fine-grained object classification (e.g., feature databases, filter banks, classification model, a projection matrix, etc.). In one embodiment, the training system 190 resides on a remote server 210. In another embodiment, the training system 190 resides on the device 100.

In one embodiment, the training system 190 comprises, but is not limited to, one or more of the following components: (1) a database builder 210 configured to build one or more two-dimensional (2D) to three-dimensional (3D) feature databases 320 (FIG. 3) for one or more fine-grained object categories (i.e., classes), and (2) a feature learning unit 234 configured to learn one or more 2D convolutional filter banks 197, a projection matrix 195 for reducing feature dimensions, and a classification model 196.

The training system 190 may maintain one or more databases. In one embodiment, the databases comprise one or more image databases 310 for one or more fine-grained object categories (e.g., CATEGORY$_1$, . . . , CATEGORY$_N$). Each image database 310 corresponds to a fine-grained object category. For each fine-grained object category, a corresponding image database 310 comprises a set 311 of training images 312 from the same fine-grained object category. In one embodiment, a set 311 of training images 312 includes a plurality of different 2D images 312 capturing different illumination changes, different views, and different backgrounds of a 3D object.

In the training phase, the database builder 210 builds, for each fine-grained object category, a corresponding feature database 320. Examples of different fine-grained object categories include, but are not limited to, different categories of POS terminals 50 (e.g., Verifone MX915, Verifone MX925, etc.).

In one embodiment, the database builder 210 comprises at least one of the following: (1) a structure from motion (SfM) unit 211 configured to apply a structure from motion approach for 3D reconstruction, and (2) a descriptors units 212 configured to add local 2D feature descriptors 332 to 3D points 322.

For a fine-grained object, a corresponding feature database 320 comprises a set 321 (FIG. 3) of sparse 3D points 322 (FIG. 3) representing sparse geometry of a shape of a 3D object. As described in detail later herein, in the training phase, the database builder 210 determines the set 321 of sparse 3D points based on a set 311 (FIG. 3) of training images 312 (FIG. 3) from the same fine-grained object category.

In the training phase, the database builder 210 is further configured to add, for each 3D point 322, a corresponding set 331 (FIG. 3) of local 2D feature descriptors 332 (FIG. 3) to the 3D point 322. Each 3D point 322 of the set 321 is associated with a corresponding set 331 of local 2D feature descriptors 332 indicative of a visual appearance of the 3D object surrounding the 3D point 322.

As described in detail later herein, in the training phase, the feature learning unit 234 applies CSC to learn one or more 2D convolutional filter banks 197.

As described in detail later herein, in one embodiment, in the training phase, the feature learning unit 234 applies a manifold learning algorithm to learn a projection matrix for reducing feature dimensions (i.e., transforming original features to a low-dimensional space). The manifold learning algorithm applied may be Orthogonal Locality Preserving Projections (OLPP) or another manifold learning scheme.

In one embodiment, in the training phase, the feature learning unit 234 trains a learned classification model 196 for mapping a feature of a low-dimensional space to a corresponding fine-grained object category by training one or more support vector machines (SVMs) based on feature vectors. To prevent over-fitting, a validation set is randomly selected to optimize parameters for the SVMs. Based on cross-validation, there are many different experimental folds, and a set of parameters with best performance is selected.

Figure 3:
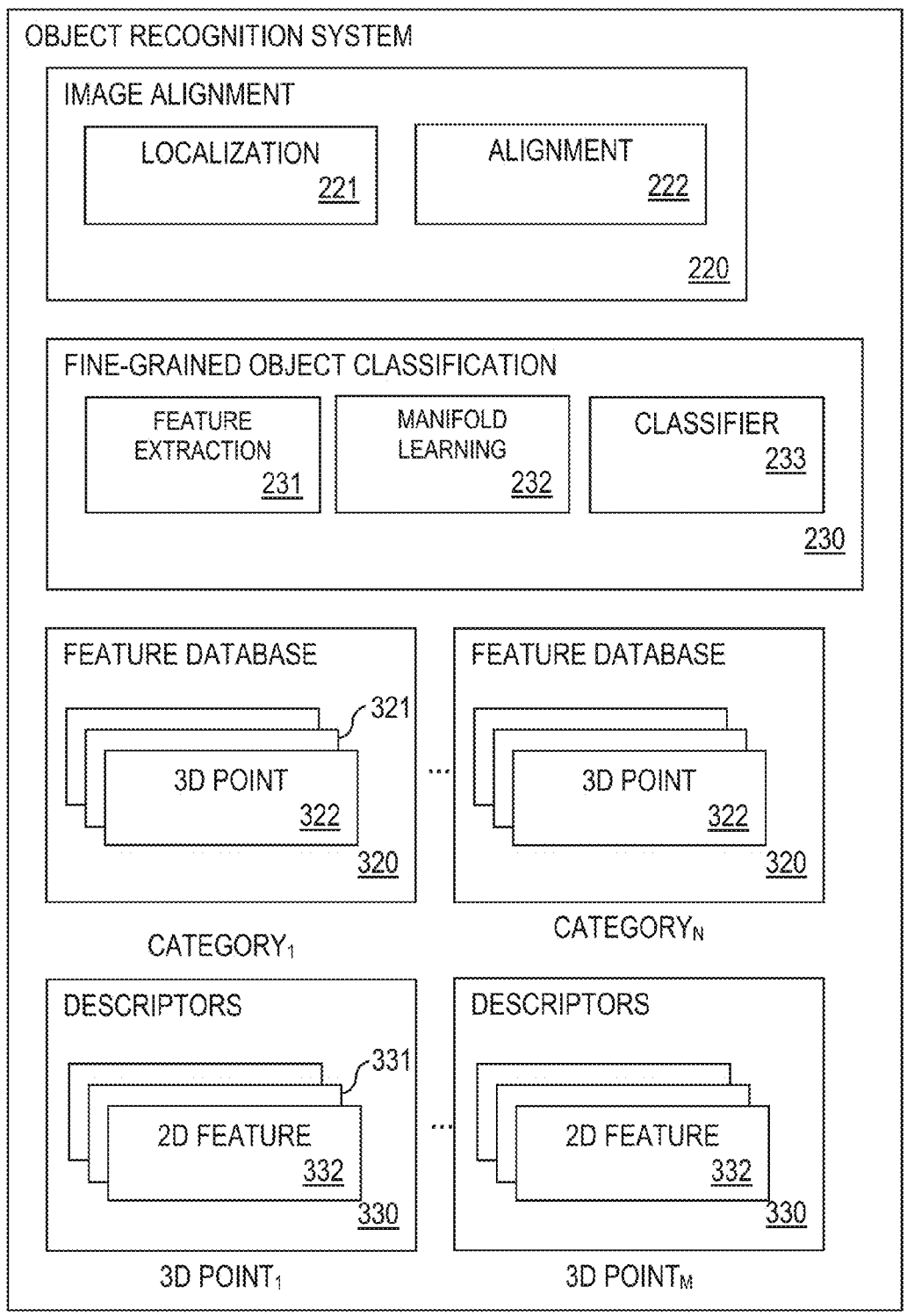
FIG. 3 illustrates an example object recognition system in detail, in one or more embodiments.

FIG. 3 illustrates an example object recognition system 200 in detail, in one or more embodiments. The system 200 comprises, but is not limited to, one or more of the following components: (1) an image alignment unit 220, and (2) a fine-grained object classification unit 230.

In a deployment phase, the image alignment unit 220 is configured to: (1) in response to receiving an input image 313 (e.g., an image captured by a sensor module 150), estimate a camera pose of the input image 313, and (2) align the input image 313 to a desired camera pose using a learned feature database 320 (e.g., a learned feature database 320 trained by the training system 190 in the training phase).

In one embodiment, the image alignment unit 220 comprises at least one of the following: (1) a localization unit 221 configured to estimate camera information for an input image 313 (e.g., an intrinsic matrix, a rotation matrix, and a translation matrix) and a camera pose of the input image 313, and (2) an alignment unit 222 configured to produce an aligned image 360, wherein the aligned image 360 comprises a portion of the input image 313 aligned to a desired camera pose.

In the deployment phase, the fine-grained object classification unit 230 is configured to classify a fine-grained object included in the input image 313 based on the aligned image 360 received from the alignment unit 222 and a learned classification model (e.g., a learned classification model 196 trained by the training system 190 in the training phase). In one embodiment, the fine-grained object classification unit 230 comprises at least one of the following: (1) a feature extraction unit 231 configured to apply a single-layer feature extraction scheme that provides both low-level feature representation and high-level feature representation of the object, (2) a manifold learning unit 232 configured to apply a learned projection matrix (e.g., a learned projection matrix 195 trained by the training system 190 in the training phase) to reduce feature dimensions, and (3) a classifier 233 configured to map a feature to a corresponding fine-grained object category based on the learned classification model.

As stated above, the one or more storage units 120 may maintain one or more databases 130. In one embodiment, the databases 130 comprise one or more learned feature databases 320 (e.g., a learned feature database 320 trained by the training system 190 in the training phase) for one or more fine-grained object categories (e.g., CATEGORY$_1$, ..., CATEGORY$_N$). Each feature database 320 corresponds to a fine-grained object category. Each feature database 320 comprises a set 321 of sparse 3D points 322.

In one embodiment, the databases 130 further comprise one or more descriptors databases 330 (e.g., sets of descriptors 332 determined by the training system 190 in the training phase) for one or more 3D points 322 (e.g., 3D POINT$_1$, ..., 3D POINT$_M$). Each descriptors database 330 corresponds to a 3D point 322. Each descriptors database 330 comprises a set 331 of local 2D feature descriptors.

Figure 4:
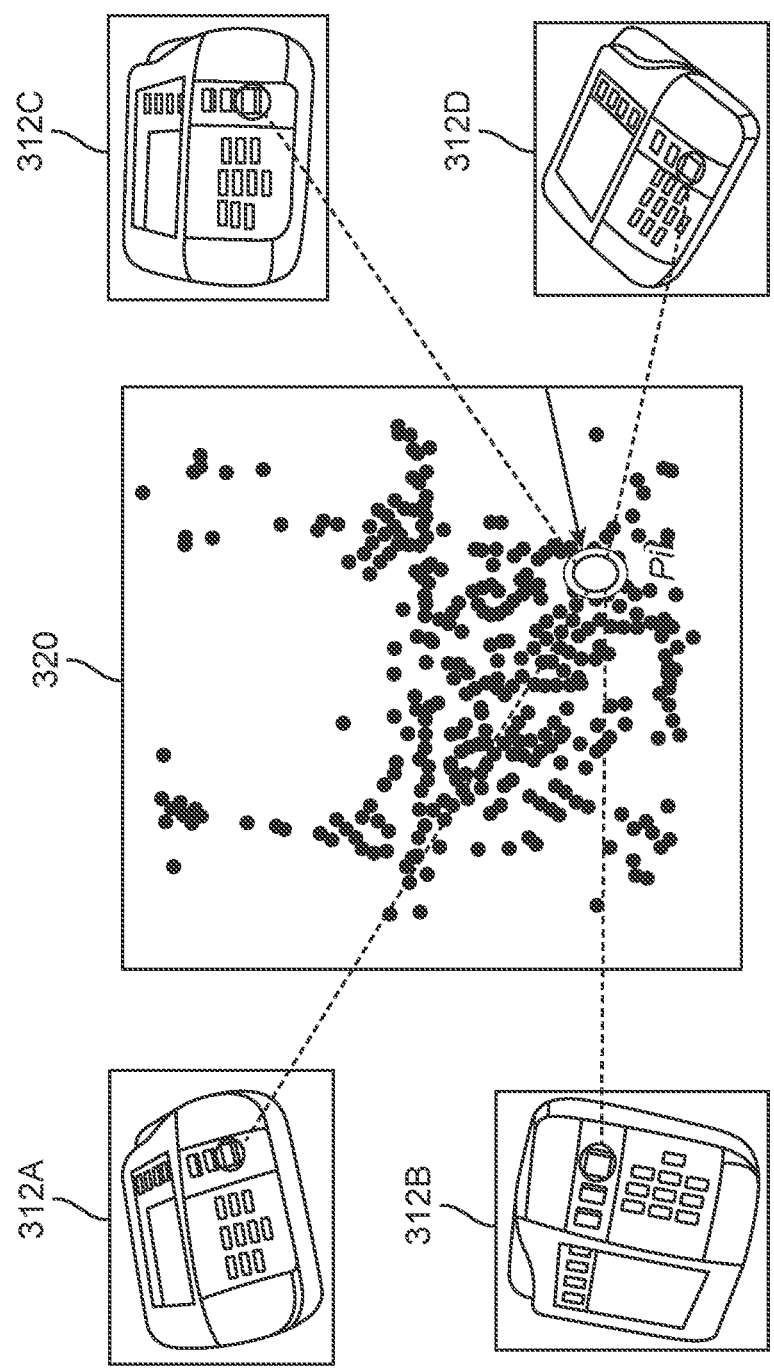
FIG. 4 illustrates an example process for building a feature database, in one or more embodiments.

FIG. 4 illustrates an example process for building a feature database 320, in one or more embodiments. Let $\{p_i\}$ denote a set of sparse 3D points representing sparse geometry of a shape of a 3D object. A feature database 320 comprises a set of sparse 3D points $\{p_i\}$ Let $\{I_i\}$ denote a set of n training images 312, wherein n≥2. For example, if the 3D object is a POS terminal 50, the set of training images $\{I_i\}$ may include a plurality of different 2D images 312A-312D capturing the POS terminal 50 at different angles. Let j denote a track representing a projection of a 3D point $p_i$ on multiple training images 312 of a set of training images $\{I_i\}$. Let $\{d_{ij}\}$ denote a set of local 2D feature descriptors. Let $\{C_i\}$ denote a set of unknown camera parameters.

In the training phase, for each fine-grained object category, the database builder 210 is configured to compute a set of oriented FAST, rotated BRIEF (ORB) 2D keypoints and descriptors based on each training image 312 of a set of training images $\{I_i\}$ from the same fine-grained object category. Similar 2D features (i.e., 2D keypoints and descriptors) are matched and matching 2D features are organized across the set of training images $\{I_i\}$ into a plurality of tracks. Each track j comprises a set of consistently matching 2D keypoints and descriptors across multiple training images 312 of the set of training images $\{I_i\}$.

For a feature database 320 corresponding to a fine-grained object category, the database builder 210 determines a set of sparse 3D points $\{p_i\}$ to include in the feature database 320 based on a set of training images $\{I_i\}$ from the same fine-grained object category. In one embodiment, positions of the set of sparse 3D points $\{p_i\}$ are computed based on bundler adjustment. Let $K_i$ denote an intrinsic matrix, let $R_i$ denote a rotation matrix, and let $T_i$ denote a translation matrix. The matrices $K_i$, $R_i$, and $T_i$ may be constructed based on a set of unknown camera parameters $\{C_i\}$. Let P denote a projection equation from a 3D point $p_j$ to a 2D keypoint k on a training image $I_i$ of the set $\{I_i\}$. In one embodiment, the projection equation P may be represented in accordance with equation (1) provided below:

$$k = P(C_i, p_j) = K_i[R_i|T_i]p_j \tag{1},$$

wherein $C_i$ denotes an unknown camera parameter of the set $\{C_i\}$.

In one embodiment, one or more re-projection errors are minimized in accordance with equation (2) provided below:

$$\sum_{i}^{n}\sum_{j}^{m} \|k_{ij} - P(C_i, p_j)\|, \tag{2}$$

wherein $k_{ij}$ denotes a 2D keypoint from the training image $I_i$ in a track j representing a projection of the 3D point $p_j$. The unknown camera parameter $C_i$ and the 3D point $p_j$ may be computed using equation (2) provided above.

Let J denote a Jacobian matrix for the projection equation P, let H denote a Hassian approximation, and let d*I denote a damping matrix, wherein d is a scalar, and I is an identity matrix. In one embodiment, to estimate a camera pose, a Jacobian matrix J for the projection equation P is computed, and a Hassian approximation His assembled using the Jacobian matrix J. A damping matrix d*I is applied to the Hassian approximation H. If an estimated camera pose of an image causes a large re-projection error, the scalar d may be adjusted to a larger value in a subsequent iteration; otherwise, the scalar d may be adjusted to a smaller value.

In the training phase, the descriptors unit 212 associates, for each 3D point $p_i$, a corresponding set of local 2D feature descriptors $\{d_{ij}\}$ indicative of a visual appearance of a 3D object surrounding the 3D point $p_i$. Specifically, during 3D reconstruction, each 3D point $p_j$ is natively associated with a set of local 2D feature descriptors $\{d_{ij}\}$ comprising a set of 2D keypoints $\{k_{ij}\}$ from a training image $I_i$ in a track j representing a projection of a 3D point $p_j$.

Localization errors may arise when localizing an image from an uncovered angle as a set of training images $\{I_i\}$ may not cover a visual appearance of a 3D object surrounding a 3D point $p_i$ from all possible viewpoint angles. To reduce or eliminate such errors, 2D features are augmented by warping each training image 312 in a set of training images $\{I_i\}$ to create a set of synthetic views.

In one embodiment, a training image 312 is warped by placing the image 312 in a virtual hemisphere parameterized in accordance with equation (3) provided below:

$$(x,y,z) = (\cos(\underline{u})*\sin(v), \sin(u)*\sin(v), \cos(\underline{v})) \tag{3},$$

wherein u and v are points on a surface of the virtual hemisphere surface. Let $N^T$ denote sampled/target normal directions. The points u and v are uniformly sampled to obtain sampled/target normal directions $N^T$ in accordance with equation (4) provided below:

$$N^T = (x_s, y_s, z_s) \tag{4}.$$

The training image 312 is rotated to align a normal direction of the image to each sampled/target normal direction of $N^T$, and one or more warped images providing synthetic views are rendered. For each 3D point $p_j$ a corresponding set of local 2D feature descriptors $\{d_{ij}\}$ is recomputed based on the warped images and added to the 3D point $p_j$.

Figure 5:
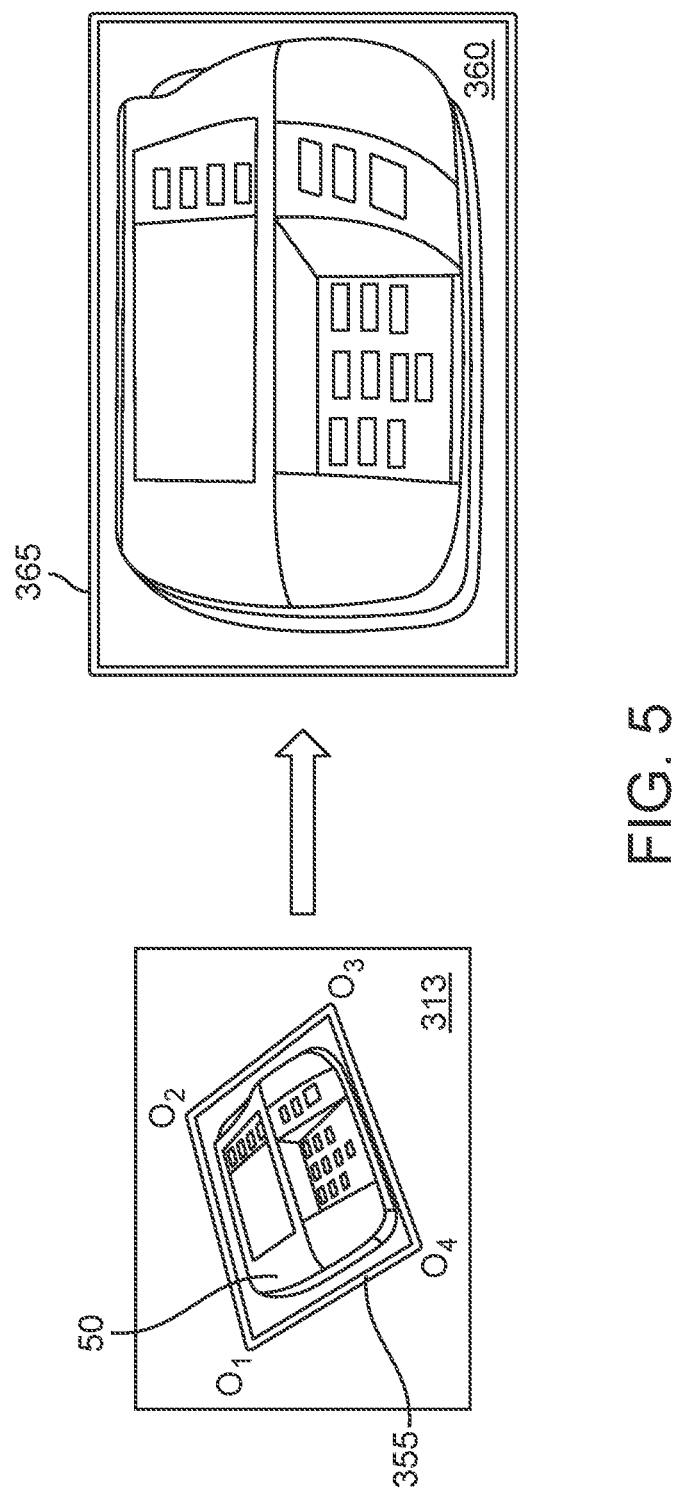
FIG. 5 illustrates an example image alignment, in one or more embodiments.

FIG. 5 illustrates an example image alignment, in one or more embodiments. In the deployment phase, the image alignment unit 220 estimates a camera pose of an input image 313 based on at least one learned feature database (e.g., a learned feature database 320 trained by the training system 190 in the training phase) to localize its camera pose, and aligns the input image 313 to a desired camera pose to produce an aligned image 360. For example, if the input image 313 comprises a 2D image of a POS terminal 50, the resulting aligned image 360 comprises a portion of the 2D image of the POS terminal 50 aligned to a desired camera pose.

Let $(x_k, y_k)$ denote a pair of 2D-3D points, wherein $k=1, \ldots, N$, and $x_k/y_k$ are 2D/3D points. Let A denote a matrix comprising all unknown camera parameters of camera. Let X and Y denote matrices comprising $x_k$ and $y_k$ in corresponding columns, respectively. The matrices A, X, and Y satisfy equation (5) provided below:

$$X = AY \qquad (5).$$

In one embodiment, matrix A is determined in accordance with equation (6) provided below:

$$A = XY^T(YY^T) \qquad (6).$$

In one embodiment, the image alignment unit 220 applies a direct linear transformation (DLT) algorithm (e.g., a 6-point DLT algorithm such as P6P) to estimate a camera pose of an input image 313. Alternatively, the image alignment unit 220 applies a Perspective-Three-Point (P3P) algorithm if the input image 313 has an exchangeable image file format (Exif) tag that includes focal length.

3D objects from different fine-grained object categories share similar shapes and scales. As such, the image alignment unit 220 determines a single 3D rectangular surface 355 to utilize as an approximated bounding box for all fine-grained object categories. To align an input image 313, the image alignment unit 220 projects the 3D rectangular surface 355 onto the input image 313 based on camera information (e.g., matrices K, R, and T), and obtains four projected 2D corners $O_1$, $O_2$, $O_3$, and $O_4$. The image alignment unit 220 transforms the four projected 2D corners $O_1$, $O_2$, $O_3$, and $O_4$ to a 2D rectangle 365. A resulting aligned image 360 comprises a cropped image inside the 2D rectangle 365, wherein the cropped image is a portion of the input image 313 that includes the 3D object.

In one embodiment, in the deployment phase, the image alignment unit 220 computes a group of camera pose candidates for each probe image 313 utilizing feature databases 320 for all fine-grained object categories. To generate the largest percentage of inlier points, the best camera pose candidate is selected from the group. In one embodiment, the best camera pose candidate is selected based on a measurement of similarity.

Let F denote a learned 2D convolutional filter bank (e.g., a learned filter bank 197 trained by the training system 190 in the training phase). The learned filter bank F comprises a set of learned convolutional kernels $f_k$, wherein $F=\{f_k\}$, and $1 \leq k \leq K$. Without loss of generality, the number of learned convolutional kernels $f_k$ included in the learned filter bank F is set to K. The learned filter bank F is compact and has a moderate model complexity (i.e., total number of parameters $\sim \Theta(10k)$).

In one embodiment, the number of learned convolutional kernels $f_k$ included in the learned filter bank F is set to $K=256$. Each learned convolutional kernels $f_k$ represents a semantically meaningful learned pattern having size 11×11.

The set of learned convolutional kernels $f_k$ represent significant variations, such as different orientations, frequencies, and distinct structures. The learned filter bank F may be used to characterize higher-order image statistics by decomposing each training image $x_i$ of the set X as a sum of a series of sparse feature maps $e_k^i \in E^i$ convolved with learned convolutional kernels $f_k$ from the learned filter bank F.

As stated above, in one embodiment, in the training phase, the feature learning unit 234 of the training system 190 applies CSC to learn a filter bank F. Let X denote a set of N training images 312, wherein $X=\{x_i\}$, and $1 \leq i \leq N$. Each training image $x_i$ of the set X comprises a 2D image with dimension p×q. In one embodiment, the feature learning unit 234 applies CSC to solve equation (7) provided below:

$$\min_{F,E} \mathcal{L} = \sum_{i=1}^{N} \left\{ \left\| x_i - \sum_{k=1}^{K} f_k * e_k^i \right\|_F^2 + \alpha \sum_{k=1}^{K} \|e_k^i\|_1 \right\} \qquad (7)$$

$$\text{s.t. } \|f_k\|_2^2 = 1, \forall k = 1, \ldots, K,$$

wherein a first term of equation (7) represents a reconstruction error, a second term of equation (7) represents a $l_1$-norm penalty, a represents a regularization constant, * represents a discrete convolution operator, and $f_k$ and $\forall_k$ are restricted to representing a unit energy to avoid trivial solutions. The learned filter bank F is constructed by balancing the reconstruction error and the $l_1$-norm penalty.

In one embodiment, the feature learning unit 234 applies a general iterative method to optimize equation (7). For example, the feature learning unit 234 may apply an Iterative Shrinkage Thresholding algorithm (ISTA) to compute sparse feature maps $e_k^i$. A stochastic gradient descent may be used to update the learned filter bank F based on training one sample at a time. As another example, the feature learning unit 234 applies a Fast Iterative Shrinkage Thresholding algorithm (FISTA) to solve a $l_1$-norm regularized least squares problems. FISTA has quadratic convergence properties.

Figure 6:
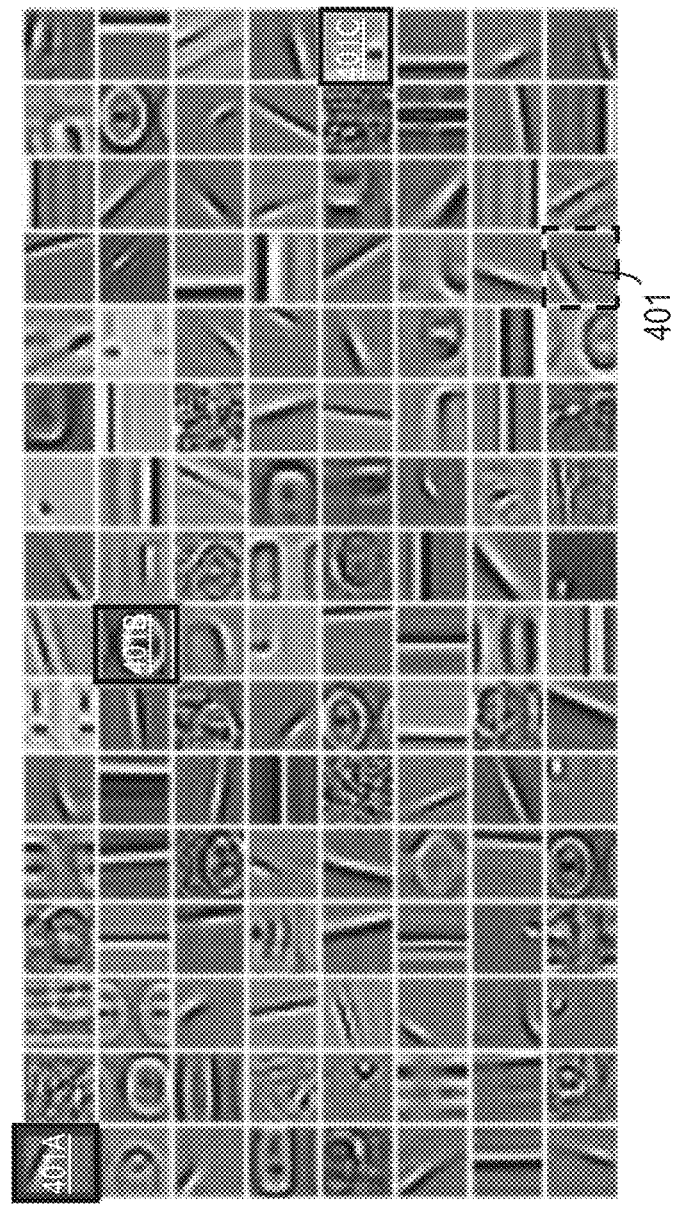
FIG. 6 illustrates an example learned filter bank, in one or more embodiments.

FIG. 6 illustrates an example learned filter bank 400, in one or more embodiments. The filter bank 400 may be an example learned filter bank 197 trained by the training system 190 in the training phase. The filter bank 400 comprises a set of learned convolutional kernels 401 that may include, but are not limited to, edge primitive filters 401A at various angles and filters representing complex feature patterns, such as circular shaped filters 401B, corner structure filters 401C, other types of filters used to extract these salient features for object recognition.

Figure 7:
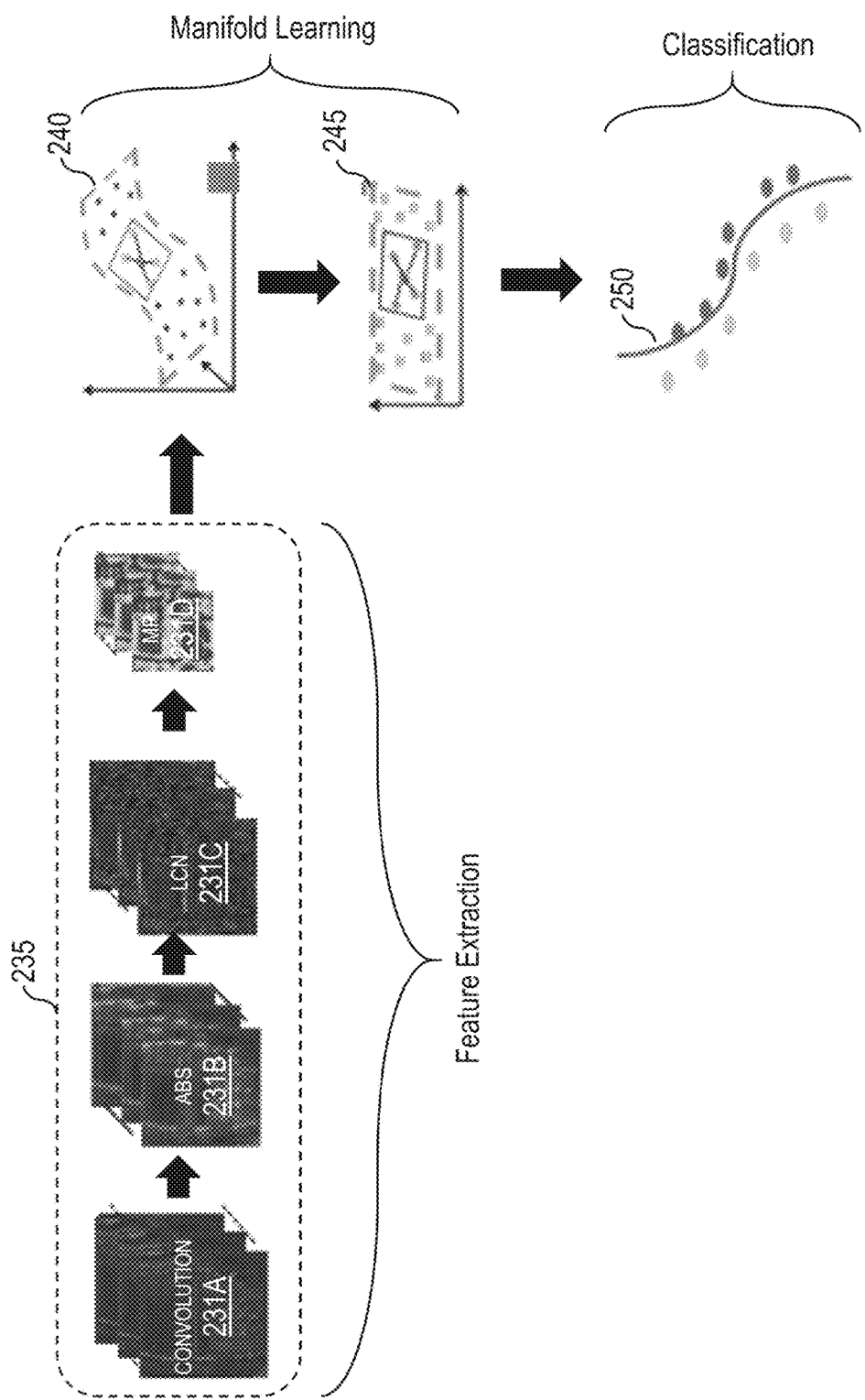
FIG. 7 illustrates an example single-layer feature extraction scheme, in one or more embodiments.

FIG. 7 illustrates an example single-layer feature extraction scheme, in one or more embodiments. As stated above, in the deployment phase, the feature extraction unit 231 of the object recognition system 200 utilizes a single-layer feature extraction scheme that provides both low-level feature representation and high-level feature representation of an object. For example, instead of utilizing a multi-layer deep neural network, the single-layer feature extraction scheme may be implemented as a pipeline 235.

In one embodiment, before applying feature extraction, all input data (e.g., each aligned image 360) is resized into the same size (e.g., 100×100). A convolution layer 231A of the pipeline 235 is configured to convolve each aligned image 360 with the learned convolutional kernels $f_k$ from a learned filter bank F (e.g., a learned filter bank 197 trained by the training system 190 in the training phase). During convolution, each aligned image 360 is decomposed as a sum of a series of sparse feature maps $e_k^i \in E^i$ convolved with learned convolutional kernels $f_k$ from the learned filter bank F.

After convolution, the sparse feature maps $e_k^i$ are processed by subsequent layers of the pipeline 235. In one embodiment, the pipeline 235 comprises the following three cascaded layers: (1) an element-wise absolute value rectification (ABS) layer 231B, (2) a local contrast normalization (LCN) layer 231C, and (3) a max-pooling (MP) layer 231D. The ABS layer 231B is configured to compute an absolute value element-wise for a given feature map $m_k$, where $y_k^a$, |ek| represents the k-th feature map. The LCN layer 231C is configured to apply local subtractive and divisive operations within each feature map to enhance stronger feature responses and suppresses weaker ones across the feature map.

In one embodiment, the pipeline 235 may not include the ABS layer 231B and the LCN layer 231C (i.e., ABS and LCN are non-essential processing steps). Not having to perform ABS and LCN increases efficiency of the pipeline 235, thereby reducing overall computation time, especially for input data comprising a high-resolution image. As object recognition on images with abnormal lighting conditions becomes much more challenging without ABS and LCN, however, pre-processing steps may be incorporated at the beginning of the pipeline 235, such as an illumination and resolution detection layer. Multiple algorithms may be applied during these pre-processing steps, such as, but not limited to, measuring brightness of an input image as a reference of a condition of illumination.

In one embodiment, after LCN, the MP layer 231D applies max-pooling to down-sample feature maps and create position invariance over larger local regions. Max-pooling may be applied to select invariant features and improve generalization performance. One or more resulting feature maps 240 are obtained after max-pooling.

Let $Y^m$ denote one or more features from a resulting feature map 240 after max-pooling, wherein $Y^m = \{y_k^m\}$, and $1 \leq k \leq K$. Each feature $Y^m$ may be referred to as a Hierarchical Learning Feature (HLF).

As stated above, in one embodiment, in the training phase, the feature learning unit 234 of the training system 190 applies a manifold learning algorithm to learn a projection matrix for reducing feature dimensions. Let W denote a low-dimensional space, and let P denote a projection matrix for transforming original features $Y^m$ to the low-dimensional space W. In one embodiment, the feature learning unit 234 determines a projection matrix P for transforming original features $Y^m$ to a low-dimensional space W satisfying equation (8) provided below:

$$W = P^T Y^m \tag{8}$$

wherein $P \in R^{d \times l}$, $Y^m \in R^{d \times N}$, $P^T Y^m \in R^{l \times N}$, $l \geq d$, and R denotes a high dimensional data space.

In the deployment phase, the manifold learning unit 232 applies a learned projection matrix (e.g., a learned projection matrix 195 trained by the training system 190 in the training phase) to reduce feature dimensions for original features $Y^m$. Specifically, the manifold learning unit 232 projects a first low-dimensional space 245 from a second dimensional space, wherein the second dimensional space has more dimensions than the first dimensional space. This enables fine-grained object classification on devices with limited resources (e.g., mobile devices).

In the deployment phase, a resulting low-dimensional space 245 is directly fed into the classifier 233. In one embodiment, the classifier 233 utilizes a learned classification model (e.g., a learned classification model 196 trained by the training system 190 in the training phase) to map a feature of the low-dimensional space 245 to a corresponding fine-grained object category.

Let $\vartheta$ denote an input feature vector, let y denote a label for the feature vector $\vartheta$, and let $k(\vartheta, y)$ denote a histogram intersection kernel 250. In one embodiment, the classifier 233 selects a histogram intersection kernel $k(\vartheta, y)$ satisfying equation (9) provided below:

$$k(\vartheta, y) = \sum_{i=1}^{n} \min(\vartheta(i), y(i)) \min(\vartheta(i), y(i)) \tag{9}$$

The classifier 233 is configured to perform classification based on an evaluation of $\text{sign}(d(\vartheta))$, wherein $d(\vartheta)$ is represented in accordance with equation (10) provide below:

$$d(\vartheta) = \sum_{j=1}^{m} a_j y_j k(\vartheta, \vartheta_j) + b \tag{10}$$

wherein $y_j$ denotes a label for feature $\vartheta_j$ of the feature vector $\vartheta$, and a and b are constants.

Figure 8:
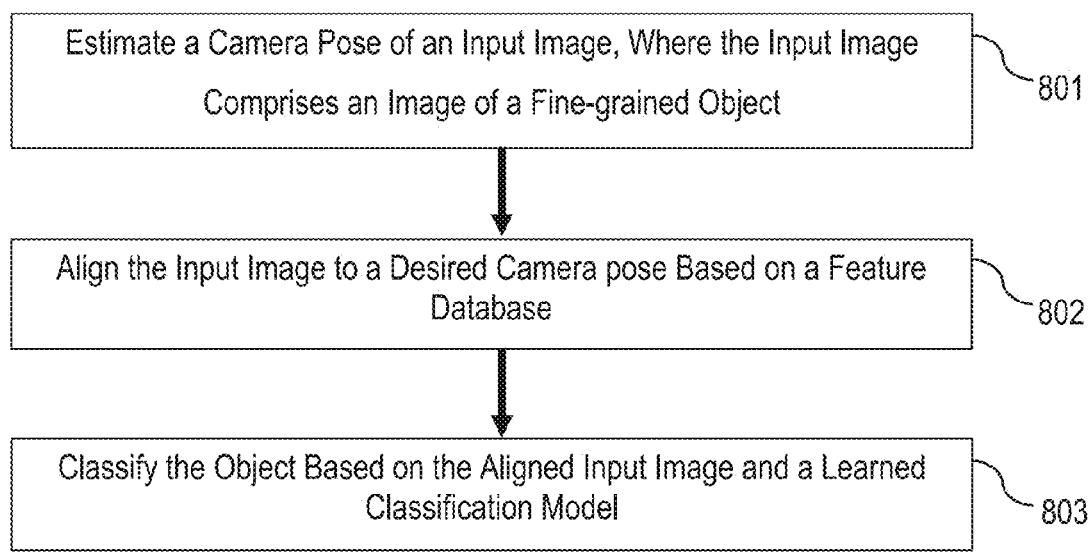
FIG. 8 is a flowchart of an example process for fine-grained object recognition, in one or more embodiments.

FIG. 8 is a flowchart of an example process 800 for fine-grained object recognition, in one or more embodiments. In process block 801, estimate a camera pose of an input image, where the input image comprises an image of a fine-grained object. In process block 802, align the input image to a desired camera pose based on a feature database. In process block 803, classify the object based on the aligned input image and a learned classification model.

In one embodiment, process blocks 801-803 may be performed by at least the image alignment unit 220 and the fine-grained object classification unit 230 of the object recognition system 200.

Figure 9:
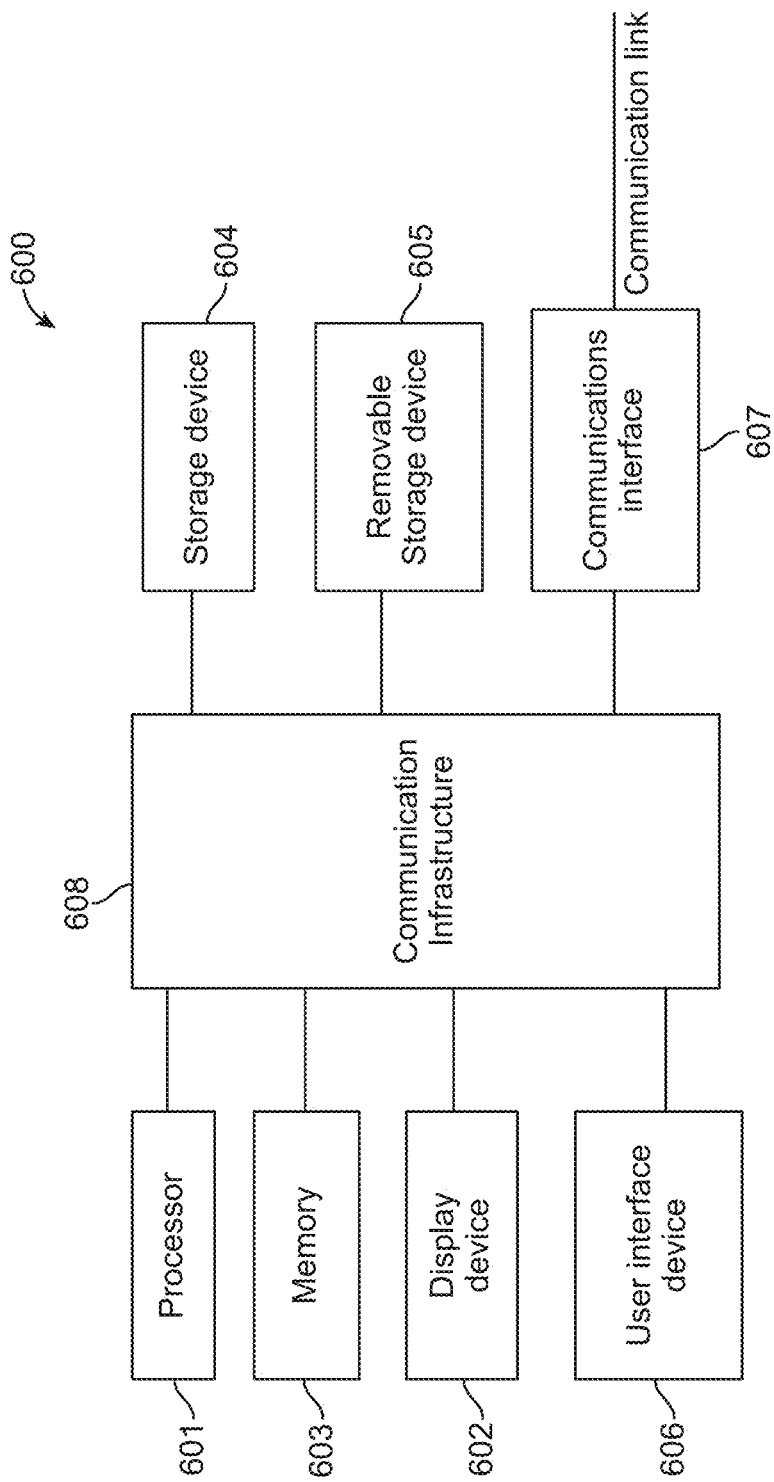
FIG. 9 is an exemplary high-level block diagram showing an information processing system comprising a computer system useful for implementing disclosed embodiments.

FIG. 9 is a high-level block diagram showing an information processing system comprising a computer system 600 useful for implementing the disclosed embodiments. Computer system 600 may be incorporated in a display device 300 or a server device 210. The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), viewer interface device 606 (e.g., keyboard, touch screen, keypad, pointing device), and a communication interface 607 (e.g., modem, a network interface (such as an Ethernet card), a communications port, or a PCMCIA slot and card). The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 800 (FIG.

8) may be stored as program instructions on the memory 603, storage device 604 and the removable storage device 605 for execution by the processor 601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A method comprising:
    estimating a camera pose of an input image, wherein the input image comprises an image of a fine-grained object;
    aligning the input image to a desired camera pose by projecting a first multi-dimensional space onto the input image from a second multi-dimensional space based on a feature database comprising a set of multi-dimensional points, wherein a resulting aligned input image comprises the object inside the first multi-dimensional space, and the first multi-dimensional space has fewer dimensions than the second multi-dimensional space and the set of multi-dimensional points; and
    classifying the object based on the first multi-dimensional space of the aligned input image.

2. The method of claim 1, wherein the set of multi-dimensional points comprises a set of sparse multi-dimensional points representing sparse geometry of a shape of the object.

3. The method of claim 2, wherein the set of sparse multi-dimensional points is based on a set of images including the object, and the set of images are captured from different camera poses to illustrate different illumination changes and backgrounds of the object.

4. The method of claim 3, wherein a portion of the object in each image of the set of images triangulates to a same multi-dimensional point of the feature database.

5. The method of claim 4, wherein each multi-dimensional point of the feature database is associated with a corresponding set of local multi-dimensional feature descriptors indicative of a visual appearance of the object about the multi-dimensional point.

6. The method of claim 1, wherein the classifying the object comprises utilizing a single-layer feature extraction scheme that provides both low-level feature representation and high-level feature representation of the object.

7. The method of claim 1, wherein the projecting the first multi-dimensional space onto the input image from the second multi-dimensional space comprises:
    projecting a second multi-dimensional surface onto the input image, wherein the second multi-dimensional space has a same amount of dimensions as the set of multi-dimensional points and the second multi-dimensional surface; and
    transforming the projected second multi-dimensional surface to a first multi-dimensional surface, wherein the first multi-dimensional surface has a same amount of dimensions as the first multi-dimensional space, and the first multi-dimensional surface comprises a portion of the input image that includes the object.

8. The method of claim 7, wherein the projecting the first multi-dimensional space onto the input image from the second multi-dimensional space comprises applying a manifold learning algorithm.

9. The method of claim 1, wherein the input image is decomposed as a set of sparse feature maps convolved with one or more learned convolutional kernels.

10. A system, comprising:
    at least one processor; and
    a non-transitory processor-readable memory device storing instructions that when executed by the at least one processor causes the at least one processor to perform operations including:
        estimating a camera pose of an input image, wherein the input image comprises an image of a fine-grained object;
        aligning the input image to a desired camera pose by projecting a first multi-dimensional space onto the input image from a second multi-dimensional space based on a feature database comprising a set of multi-dimensional points, wherein a resulting aligned input image comprises the object inside the first multi-dimensional space, and the first multi-dimensional space has fewer dimensions than the second multi-dimensional space and the set of multi-dimensional points; and
        classifying the object based on the first multi-dimensional space of the aligned input image.

11. The system of claim 10, wherein the set of multi-dimensional points comprises a set of sparse multi-dimensional points representing sparse geometry of a shape of the object.

12. The system of claim 11, wherein the set of sparse multi-dimensional points is based on a set of images including the object, and the set of images are captured from different camera poses to illustrate different illumination changes and backgrounds of the object.

13. The system of claim 12, wherein a portion of the object in each image of the set of images triangulates to a same multi-dimensional point of the feature database.

14. The system of claim 13, wherein each multi-dimensional point of the feature database is associated with a corresponding set of local multi-dimensional feature descriptors indicative of a visual appearance of the object about the multi-dimensional point.

15. The system of claim 10, wherein the classifying the object comprises utilizing a single-layer feature extraction scheme that provides both low-level feature representation and high-level feature representation of the object.

16. The system of claim 15, wherein the projecting the first multi-dimensional space onto the input image from the second multi-dimensional space comprises:

projecting a second multi-dimensional surface onto the input image, wherein the second multi-dimensional space has a same amount of dimensions as the set of multi-dimensional points and the second multi-dimensional surface; and transforming the projected second multi-dimensional surface to a first multi-dimensional surface, wherein the first multi-dimensional surface has a same amount of dimensions as the first multi-dimensional space, and the first multi-dimensional surface comprises a portion of the input image that includes the object.

17. The system of claim 16, wherein the projecting the first multi-dimensional space onto the input image from the second multi-dimensional space comprises applying a manifold learning algorithm.

18. The system of claim 10, wherein the input image is decomposed as a set of sparse feature maps convolved with one or more learned convolutional kernels.

19. A non-transitory computer readable storage medium including instructions to perform a method comprising:
   estimating a camera pose of an input image, wherein the input image comprises an image of a fine-grained object;
   aligning the input image to a desired camera pose by projecting a first multi-dimensional space onto the input image from a second multi-dimensional space based on a feature database comprising a set of multi-dimensional points, wherein a resulting aligned input image comprises the object inside the first multi-dimensional space, and the first multi-dimensional space has fewer dimensions than the second multi-dimensional space and the set of multi-dimensional points; and
   classifying the object based on the first multi-dimensional space of the aligned input image.

20. The computer readable storage medium of claim 19, wherein the set of multi-dimensional points comprises a set of sparse multi-dimensional points representing sparse geometry of a shape of the object.

* * * * *